United States Patent Office 3,142,676
Patented July 28, 1964

3,142,676
PYRANO-BENZOXAZINES
Martin Eric Kuehne, Summit, N.J., assignor to Ciba Corporation, a corporation of New Jersey
No Drawing. Filed June 14, 1961, Ser. No. 116,940
9 Claims. (Cl. 260—244)

The present invention relates to axazine-type compounds. More especially, it concerns 9,10-dihydro-2H, 8H-pyrano [2,3-f] [1,3]-benzoxazine-2-ones having the novel ring system of the formula:

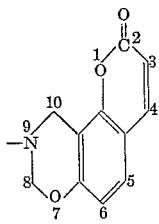

These compounds contain substituents; primarily substituted is the 9-position. Other positions, which may carry substituents are the 4-position and the 8-position, as well as the 3-position, the 5-position and 6-position. The compounds may be represented, for example, by the formula:

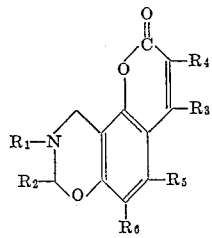

in which $R_1$ represents an aliphatic radical, a cycloaliphatic radical, a carbocyclic aryl-aliphatic radical or a heterocyclic aryl-aliphatic radical, the $R_2$ stands for hydrogen, carbocyclic aryl or heterocyclic aryl, $R_3$ stands primarily for hydrogen and lower alkyl, as well as lower alkoxy, amino, halogen, halogeno-lower alkyl and the like, and each of the groups $R_4$, $R_5$ and $R_6$ represents primarily hydrogen or has the same meaning as the radical $R_3$. Also included within the scope of this invention are acid addition salts and quaternary ammonium compounds of these compounds, as well as procedure for the preparation of the compounds of this invention.

The nitrogen atom of the oxazine portion of the compounds of this invention is substituted; substituents may be of considerable variety and are attached to the nitrogen atom through a carbon atom.

Aliphatic substituents, which contain from one to twenty carbon atoms, may substitute the nitrogen atom. They are, for example, alkyl, alkenyl, alkynyl, cycloalkyl, cycloalkenyl, cycloalkyl-lower alkyl, cycloalkyl-lower alkenyl, cycloalkenyl-lower alkyl, cycloalkenyl-lower alkenyl, bicycloalkyl and the like. Aliphatic radicals are primarily represented by alkyl groups having from one to twenty carbon atoms such as, for example, lower alkyl, e.g. methyl, ethyl, n-propyl, isopropyl, secondary butyl, n-pentyl, isopentyl, neopentyl, n-hexyl, isohexyl, n-heptyl and the like, as well as higher alkyl, such as, for example, n-octyl, 2,2,4-trimethyl-pentyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl and the like.

Other aliphatic radicals are, for example, alkenyl groups having the previously-given number of carbon atoms, such as, for example, lower alkenyl, e.g. prop-2-enyl, 2-methyl-prop-2-enyl, but-2-enyl, and the like, as well as undecylenyl and the like, or alkynyl groups, such as lower alkynyl, e.g. prop-2-ynyl, but-2-ynyl and the like.

Aliphatic radicals also include cycloaliphatic groups, which have from three to seven, especially from five to six, carbon atoms as ring members; such radicals are cycloalkyl represented, for example, by cyclopropyl, cyclobutyl, cyclopentyl, cyclohexyl, cycloheptyl and the like, as well as cycloalkenyl, e.g., cyclohex-2-enyl, cyclohex-3-enyl and the like. Cycloaliphatic-lower aliphatic radicals have carbocyclic nuclei, which have from three to seven, preferably from five to six, carbon atoms as ring members, and the lower aliphatic radical, through which these nuclei are attached to the nitrogen atoms, has from one to seven, particularly from one to three, carbon atoms. Cycloalkyl-lower alkyl groups may be represented, for example, by 2-cyclopropylethyl, cyclopentylmethyl, 1-cyclopentylethyl, 2-cyclopentylethyl, 3-cyclopentylpropyl, cyclohexylmethyl, 1-cyclohexylethyl, 2-cyclohexylethyl, 3-cyclohexylpropyl and the like, and cycloalkyl-lower akenyl radicals are represented, for example, by 3-cyclohexyl-prop-2-enyl and the like. Cycloalkenyl-lower alkyl or cycloalkenyl-lower alkenyl radicals may be, for example, cyclohex-3-enyl-methyl, 2-(cyclopent-2-enyl)-ethyl, 2-(cyclohex-3-enyl)-prop-2-enyl and the like.

These aliphatic, including cycloaliphatic, radicals may have additional substituents. Lower aliphatic hydrocarbon radicals, particularly lower alkyl, e.g. methyl, ethyl, n-propyl, iso-propyl, n-butyl, tertiary butyl and the like, may be attached to the aforementioned radicals, particularly to the cycloaliphatic groups. Functional groups, which represent substituents attached to the previously-mentioned aliphatic radicals are, for example, hydroxyl, lower alkoxy, e.g. methoxy, ethoxy, n-propyloxy, isopropyloxy and the like, polyalkylenedioxy, e.g. polyethylenedioxy, polypropylenedioxy and the like, mercapto, lower alkyl-mercapto, e.g. methylmercapto, ethylmercapto and the like, amino, such as monosubstituted amino, for example, N-lower alkyl amino, e.g. N-methylamino and the like, or particularly disubstituted amino, such as, for example, N,N-di-lower alkyl-amino, e.g. N,N-dimethylamino, N-ethyl-N-methyl-amino, N,N-diethylamino, N,N-dipropylamino, N,N-di-isopropyl-amino and the like, N,N-alkylene-imino, in which alkylene has from four to six carbon atoms, e.g. 1-pyrrolidino, 1-piperidono, 1-N,N-hexamethylene-imino and the like, N,N-oxa-alkylene-imino, in which alkylene has particularly four carbon atoms, e.g. 4-morpholino and the like, N,N-thia-alkylene-imino, in which alkylene contains particularly four carbon atoms, e.g. 4-thiamorpholino and the like, or N,N-aza-alkylene-imino, in which alkylene has preferably four carbon atoms, e.g. piperazino, 4-methyl-1-piperazino, 4-(2-hydroxyethyl)-1-piperazino, 4-(2-acet-oxyethyl)-1-piperazino and the like, halogeno, e.g. fluoro, chloro, bromo and the like, carboxyl or functionally converted carboxyl, such as esterified carboxyl, for example, carbo-lower alkoxy, e.g. carbomethoxy, carbethoxy and the like, or carbamyl, such as carbamyl, N-lower alkyl-carbamyl, e.g. N-methyl-carbamyl, N-ethyl-carbamyl and the like, or N,N-di-lower alkyl-carbamyl, e.g. N,N-dimethyl-carbamyl and the like. Aliphatic radicals having functional groups are primarily alkyl, preferably lower alkyl, radicals; such radicals are represented by alkylene, such as lower alkylene, e.g. methylene, 1,1-ethylene, 1,2-ethylene, 1-methyl-1,2-ethylene, 2-methyl-1,2-ethylene, 1,3-propylene, 1,4-butenyl, and the like, as well as 1,10-decylene and the like, and have a carbo-lower alkoxy group, e.g. carbomethoxy, carbethoxy and the like, a carbamyl group, e.g. carbamyl and the like, an N,N-di-lower alkylamino group, e.g. N,N-dimethyl-amino, N,N-diethylamino and the like, an N,N-alkyleneimino group, e.g. 1-pyrrolidino, 1-piperidino and the like, a polyalkylenedioxy group, e.g. polyethylenedioxy and the like or any other suitable substituent. One or more than one of the same or of different substituents may be attached to the above-mentioned radicals.

Other groups of substituents attached to the nitrogen atom of the 1,3-oxazine portion are, for example, carbocyclic aryl-aliphatic radicals, for example, monocyclic carbocyclic aryl-lower alkyl, such as phenyl-lower alkyl, e.g. benzyl, diphenylmethyl, 1-phenylethyl, 2-phenylethyl, 3-phenylpropyl and the like, or bicyclic carbocyclic aryl-lower alkyl, such as naphthyl-lower alkyl, e.g. 1-naphthyl-methyl, 2-naphthylethyl, 1-(1-naphthyl)-ethyl, 2-(1-naphthyl)-ethyl, 1-(2-naphthyl)-ethyl, 2-(2-naphthyl)-ethyl and the like, or carbocyclic aryl-lower alkenyl, for example, monocyclic carbocyclic aryl-lower alkenyl, such as phenyl-lower alkenyl, e.g. 3-phenyl-prop-2-enyl and the like, or bicyclic carbocyclic aryl-lower alkenyl, such as naphthyl-lower alkenyl, e.g. 3-(2-naphthyl)-propy-2-enyl and the like. A carbocyclic aryl, e.g. phenyl or naphthyl, radical, present in a carbocyclic aryl-aliphatic group may have substituents, such as, for example, lower alkyl, e.g. methyl, ethyl and the like, lower alkoxy, e.g. methoxy, ethoxy and the like, hydroxyl, lower alkylenedioxy, e.g. methylenedioxy, mercapto, lower alkyl mercapto, e.g. methylmercapto and the like, nitro, amino, such as amino, monosubstituted amino, for example, N-lower alkyl-amino, e.g. N-methylamino, N-ethylamino and the like, or disubstituted amino, for example, N,N-di-lower alkyl-amino, e.g. N,N-dimethylamino, N,N-diethylamino and the like, halogeno, e.g. fluoro, chloro, bromo and the like, trifluoromethyl, carboxyl, functionally converted carboxyl, such as carbo-lower alkoxy, e.g. carbomethoxy, carbethoxy and the like, carbamyl, N-lower alkyl-carbamyl, e.g. N-methyl-carbamyl, N-ethyl-carbamyl and the like, N,N-di-lower alkyl-carbamyl, e.g. N,N-dimethyl-carbamyl and the like or any other suitable substituent. One or more than one of the same or of different substituents may be present in the carbocyclic aryl portion and any of the available positions may have such substituents; in a phenyl nucleus the 3-position and/or the 4-position are especially suitable for the attachment of substituents.

An additional type of substituents attached to the nitrogen atom of the 1,3-oxazine portion are heterocyclic aryl-aliphatic radicals. The heterocyclic aryl portions, which are primarily pentacyclic or hexacyclic ring systems have as hetero atoms one or more than one nitrogen, oxygen and/or sulphur atoms. These substituents may be represented, for example, by monocyclic heterocyclic aryl-lower alkyl such as monocyclic azacyclic aryl-lower alkyl, for example, pyridyl-lower alkyl, particularly pyridylmethyl, e.g. 2-pyridylmethyl, 3-pyridylmethyl, 4-pyridylmethyl, as well as 1-(2-pyridyl)-ethyl, 2-(4-pyridyl)-ethyl, 3-(2-pyridyl)-propyl and the like, or pyridazinyl-lower alkyl, especially pyridazinylmethyl, e.g. 3-pyridazinylmethyl and the like, pyrimidyl-lower alkyl, particularly pyrimidyl-methyl, e.g. 2-pyrimidylmethyl, 4-pyrimidylmethyl and the like, pyrazinyl-lower alkyl, such as pyrazinylmethyl, e.g. 2-pyrazinylmethyl and the like, bicyclic azacyclic aryl-lower alkyl, such as quinolyl-lower alkyl, particularly quinolylmethyl and the like, monocyclic oxacyclic-lower alkyl, such as furyl-lower alkyl, primarily furylmethyl, e.g. 2-furylmethyl and the like, or monocyclic thiacyclic aryl-lower alkyl, such as thienyl-lower alkyl, particularly thienyl, e.g. 2-thienyl and the like. The heterocyclic portions may contain as additional substituents lower alkyl, e.g. methyl, ethyl and the like, lower alkoxy, e.g. methoxy, ethoxy and the like, halogeno, e.g. chloro, bromo and the like, or any other substituents shown hereinbefore as being attached to carbocyclic aryl radicals.

The group $R_2$ attached to the 8-position of the compounds of this invention stands for hydrogen. It may also represent a carbocyclic aryl radical, especially monocyclic carbocyclic aryl, e.g. phenyl or phenyl substituted by one or more than one substituent, such as, for example, halogeno, trifluoromethyl, nitro, acylamino, carboxyl, carbo-lower alkoxy, carbamyl, cyano or any other suitable substituent. Substituted phenyl radicals are, therefore, halogeno-phenyl, in which halogeno represents fluoro, chloro, bromo and the like, trifluoromethyl-phenyl, nitro-phenyl, acylamino-phenyl, in which acyl represents lower alkanoyl, e.g. acetyl, propionyl and the like, carboxy-phenyl, carbo-lower alkoxy-phenyl, in which carbo-lower alkoxy represents carbomethoxy, carbethoxy and the like, carbamyl-phenyl, cyano-phenyl, or any other suitable substituted phenyl radical. One or more than one of the same or of different substituents may be attached to any of the positions available for substitution. Other groups representing $R_2$ are, for example, heterocyclic aryl radicals, especially monocyclic azacyclic aryl radicals, for example, pyridyl, e.g. 2-pyridyl, 3-pyridyl, 4-pyridyl and the like, monocyclic oxacyclic aryl, such as furyl, e.g. 2-furyl and the like, or monocyclic thiacyclic aryl, such as thienyl, e.g. 2-thienyl and the like, whereby the heterocyclic aryl radical may contain substituents, such as, for example, those present in heterocyclic aryl radicals attached to the nitrogen atom of the 1,3-oxazine portion.

The additional groups attached to the molecule, i.e. $R_3$, $R_4$, $R_5$ and $R_6$, stand primarily for hydrogen. Substituents representing these groups, particularly $R_3$, are primarily lower alkyl, e.g. methyl, ethyl, n-propyl, isopropyl and the like, as well as any other substituent, such as hydroxyl, lower alkoxy, e.g. methoxy, ethoxy and the like, mercapto, lower alkyl-mercapto, e.g. methylmercapto and the like, amino, such as tertiary amino, particularly N,N-di-lower alkyl-amino, e.g. N,N-dimethylamino, N,N-diethylamino and the like, halogeno, e.g. fluoro, chloro, bromo and the like, halogeno-lower alkyl, e.g. trifluoromethyl and the like, or analogous substituents. Substituted new ring systems may be represented, for example, by the 4-methyl-9,10-dihydro-2H-8H-pyrano [2,3-f][1,3] benzoxazine-2-one nucleus and the like.

Salts of the compounds of this invention are particularly pharmacologically acceptable, non-toxic, acid addition salts with inorganic acids, e.g. hydrochloric, hydrobromic, sulfuric, phosphoric acids, e.g. formic, acetic, propionic, glycolic, lactic, pyruvic, malonic, succinic, maleic, hydroxymaleic, dihydroxymaleic, fumaric, malic, tartaric, citric, benzoic, cinnamic, mandelic, salicylic, 4-amino-salicylic, 2-phenoxybenzoic, 2-acetoxybenzoic acid and the like, or organic sulfonic acids, e.g. methane sulfonic, ethane sulfonic, 2-hydroxyethane sulfonic, p-toluene sulfonic acid and the like. Mono- or polysalts may be formed depending on the number of salt-forming groups present in the molecule.

Quaternary ammonium derivatives of the compounds of this invention are particularly lower alkyl quaternary ammonium halides, e.g. methyl, ethyl, n-propyl or isopropyl quaternary ammonium chloride, bromide or iodide and the like, lower alkyl quaternary ammonium lower alkyl-sulfates, e.g. methyl or ethyl quaternary ammonium methyl sulfate or ethyl sulfate and the like, lower alkyl quaternary ammonium lower alkane sulfonates, e.g. methyl or ethyl quaternary ammonium methane or ethane sulfonate and the like, lower alkyl quaternary ammonium lower hydroxy-alkane sulfonates, e.g. methyl quaternary ammonium 2-hydroxyethane sulfonate and the like, lower alkyl quaternary ammonium monocyclic carbocyclic aryl sulfonates, e.g. methyl quaternary ammonium p-toluene sulfonate and the like. Also included as quaternary ammonium compounds are lower alkyl quaternary ammonium compounds with other inorganic or organic acids, such as with those described hereinbefore as being suitable for the preparation of acid addition salts. Mono- or poly-quaternary ammonium compounds may be formed, depending on the number of tertiary amino groups present in the molecule.

The compounds of the present invention have valuable properties. For example, they absorb ultraviolet light of wavelengths between 290 and 320 m$\mu$, and can, therefore, be used as the active sun screen agent in preparations useful for the prevention of sunburns. They may be made up into such compositions according to customary methods employed for the preparation thereof. Preferably they are incorporated into a hydrophilic ointment which contains inter alia glycols, e.g. propylene glycol and the like, higher aliphatic alcohols, e.g. stearyl alcohol and the like, white petrolatum, water or any other inert ingredients used in sun screen preparations. The latter have from about three to about five percent of the new, ultraviolet light absorbent.

In addition, compounds of this invention show quieting effects in pharmacological tests and can, therefore, be used as tranquilizing and sedating agents to counteract hyperactivity, nervousness, tension and the like.

Compounds of this invention also show antifungal properties, for example, against *Blastomyces dermatitidis*, and can, therefore, be used as antifungal agents.

Furthermore, the compounds of the present invention show a retarding effect on the growth of experimentally planted, fresh or aged adenocarcinoma E.O. 771. They can, therefore, be used to suppress the growth of adenocarcinoma E.O. 771 or analogous tumors and thus relieve the host organism from secondary effects of tumor growth, such as pain and pressure on neighboring organs.

It has also been established that the compounds of the present invention are substantially free from toxic effects and unwarranted side reactions, and are, therefore, very suitable for long-lasting treatments.

A preferred group of compounds may be represented by the formula:

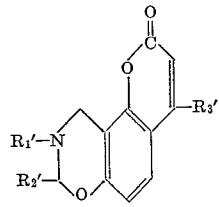

in which $R_1'$ represents lower alkyl having from one to four carbon atoms, e.g. methyl, ethyl, n-propyl, isopropyl and the like, lower alkyl having from one to four carbon atoms and substituted by a carbamyl group, particularly carbamyl, e.g. carbamylmethyl and the like, or by a carbo-lower alkoxy group, particularly carbomethoxy, e.g. carbomethoxymethyl, carbethoxymethyl and the like, cycloalkyl having from five to six carbon atoms as ring members, e.g. cyclopentyl or cyclohexyl, phenyl-lower alkyl, and (lower alkoxy-phenyl)-lower alkyl, in which lower alkoxy has from one to three carbon atoms and represents, particularly, phenyl, methoxy, e.g. 4-methoxy-phenyl, 3,4-dimethoxy-phenyl and the like, and in which lower alkyl has from one to three carbon atoms, and pyridyl-lower alkyl, in which lower alkyl has from one to three carbon atoms, e.g. 2-pyridylmethyl, 3-pyridylmethyl, 4-pyridylmethyl, 2-(2-pyridyl)-ethyl and the like, $R_2'$ represents hydrogen, monocyclic carbocyclic aryl, such as phenyl, or particularly halogeno-phenyl, in which halogeno represents fluoro, chloro, bromo and the like, nitrophenyl and the like, or pyridyl, e.g. 2-pyridyl, 4-pyridyl and the like, and $R_3$ stands for hydrogen or lower alkyl, particularly methyl, pharmacologically acceptable addition salts thereof, or lower alkyl quaternary ammonium salts, such as halides, e.g. chlorides, bromides, iodides and the like, sulfates, e.g. methyl sulfates and the like, and sulfonates, e.g. methane sulfonate, p-toluene sulfonate and the like, thereof.

The new compounds of this invention may be used in the form of preparations, which contain the new benzoxazines, the salts or the quaternary ammonium compounds thereof in admixture with an organic or inorganic, solid or liquid carrier suitable for enteral or parenteral administration. For making up the preparations there can be employed substances which do not react with the new compounds, such as water, gelatine, lactose, starches, stearic acid, magnesium stearate, talc, vegetable oils, benzyl alcohol, stearyl alcohol, gums, polyethylene glycols, polypropylene glycol or any other known carrier used in such preparations. The latter may be in solid form, e.g. as capsules, tablets, dragees and the like, or in liquid form, e.g. as solutions, suspensions, emulsions and the like. If desired, they may contain auxiliary substances, such as preserving, stabilizing, wetting, emulsifying agents and the like, salts for varying the osmotic pressure, buffers, etc. They may also contain, in combination, other useful substances.

8 - unsubstituted 9,10 - dihydro - 2H,8H-pyrano [2,3-f] [1,3] benzoxazine-2-ones, particularly those of the formula:

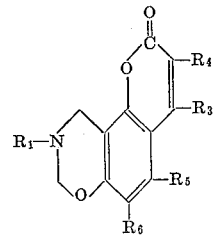

in which $R_1$, $R_3$, $R_4$, $R_5$ and $R_6$ have the previously-given meaning, or salts thereof, may be prepared, for example, by reacting an 8-unsubstituted 7-hydroxy-coumarin, such as a compound of the formula:

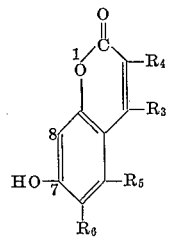

in which $R_3$, $R_4$, $R_5$ and $R_6$ have the previously-given meaning, or a precursor thereof, such as a compound of the formula:

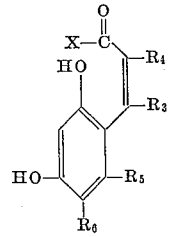

in which X stands for hydroxyl, etherified hydroxyl, particularly lower alkoxy, e.g. methoxy ethoxy and the like, halogeno, e.g. chloro and the like, or any other group which together with the carbonyl group forms a functionally converted carboxyl group, the precursor compound being capable of eliminating H—X, in which X has the previously-given meaning, under the conditions of the reaction to form the desired coumarin nucleus, or a mixture of the above described coumarin starting material and its previously shown precursor, with about one equivalent amount of an amine, such as an amine of the formula $R_1$—$NH_2$, in which $R_1$ has the previously-given meaning, and at least two equivalent amounts of formaldehyde or a reactive derivative thereof, and, if desired, converting a salt into the free compound, and/or if desired, converting a free compound into a salt or a quaternary ammonium compound thereof.

In the above reaction, formaldehyde may be used in an aqueous solution, or in the form of a polymer thereof, e.g. paraformaldehyde, trioxymethylene and the like, or in the form of any other formaldehyde furnishing reagent, e.g. hexamethylene tetramine and the like. The reaction medium is neutral or slightly alkaline; the latter may be achieved by the addition of a small amount of an alkali metal hydroxide, e.g. sodium hydroxide.

The reaction may be carried out in the presence of any inert solution, such as an alcohol, for example, a lower alkanol, e.g. methanol, ethanol, n-propanol, isopropanol and the like, an ether, for example, a cyclic ether, e.g. tetrahydrofuran, p-dioxan and the like, or a di-carbocyclic aryl ether, e.g. diphenyl ether, an amide, for example, a formamide, e.g. formamide, N,N-dimethylformamide and the like, a hydrocarbon, such as an aliphatic hydrocarbon, e.g. benzene, toluene and the like, or any other suitable solvent.

The formation of the desired compounds may be carried out under cooling, at room temperature or at an elevated temperature. Usually it is completed by heating the reaction mixture, for example, to the boiling point of the solvent, over a period from about five minutes to about twelve hours; in most cases the compounds may be formed by boiling the mixture to from about five minutes to one hour. The resulting compounds may crystallize upon cooling, or the reaction mixture may be diluted, for example, with water, and the organic materials may be extracted with a suitable organic solvent, such as, for example, a halogenated hydrocarbon, e.g. methylene chloride and the like, an ether, e.g. diethyl ether and the like, carbocyclic aryl hydrocarbon, e.g. benzene, toluene and the like. The compounds may be obtained in pure form by recrystallization, adsorption, for example, on aluminum oxide or equivalent adsorbents, and elution or any other appropriate purification procedure.

The starting materials used in the above procedure are known, or, if new, may be prepared according to any of the known methods used for the preparation of 7-hydroxy-coumarin compounds or precursors thereof, which under the reaction conditions form the desired coumarin-type compounds. It may also be possible to use a mixture of starting materials having the formulae:

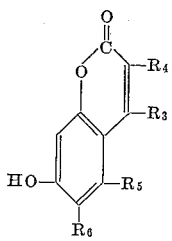 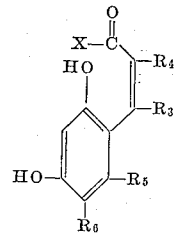

in which the radicals $R_3$, $R_4$, $R_5$ and $R_6$ have the same meaning in both formulae and X stands for one of the above-given groups. For example, a mixture of compounds of the formulae:

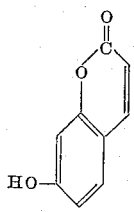 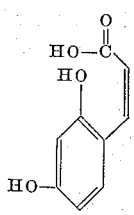

may be employed, because under the conditions of the 1,3-oxazine-ring formation, water is being split off and ring closure to the coumarin nucleus occurs. As has been shown hereinbefore, the group X represents hydroxyl, lower alkoxy, e.g. methoxy, ethoxy and the like, halogeno, e.g. chloro, bromo and the like, as well as amino, such as, unsubstituted amino, monosubstituted amino, for example, N-lower alkyl-amino, e.g. N-methylamino and the like, or disubstituted amino, for example, N,N-di-lower alkyl-amino, e.g. N,N-dimethylamino, N,N-diethylamino and the like. During the formation of the 1,3-oxazine-ring these groups are split off together with the hydrogen atom of the phenolic hydroxyl group in the form of water, a lower alkanol, a hydrogen halide, ammonia and an amine, respectively, and the coumarin ring system is formed.

Compounds of the present invention, particularly those having the formula:

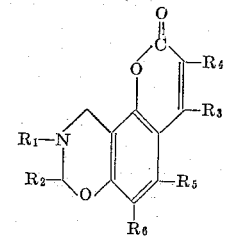

in which $R_1$, $R_2$, $R_3$, $R_4$, $R_5$ and $R_6$ have the above-given meaning, may also be prepared by treating an 8-N-substituted amino-methyl-7-hydroxy-coumarin, such as a compound of the formula:

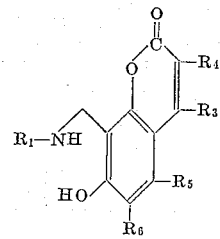

in which $R_1$, $R_3$, $R_4$, $R_5$ and $R_6$ have the previously-given meaning, or a precursor thereof, such as a compound of the formula:

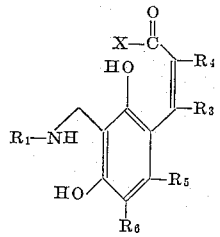

in which X has the previously-given meaning, i.e. represents hydroxyl, lower alkoxy, halogen or amino, the precursor compound being capable of eliminating H—X, in which X has the previously-given meaning, under the conditions of the reaction to form the desired coumarin nucleus, or a mixture of such compounds, with an aldehyde of the formula $R_2$—CHO, in which $R_2$ has the previously-given meaning or a reactive derivative thereof, and, if desired, carrying out the optional steps.

This reaction with an aldehyde of the formula $R_2$—CHO or a derivative thereof, is carried out along the lines of the previously shown formaldehyde procedure. A dehydrating agent, such as calcium sulfate, magnesium sulfate and the like may be added to the reaction mixture. The aldehyde of the formula $R_2$—CHO may also be used as a reactive acetal thereof, with a lower alkanol, e.g. methanol and the like, or in the case of formaldehyde, in the form of a polymer thereof.

Starting materials used in the above procedure may be prepared, for example, by treating a solution of a compound of the formula:

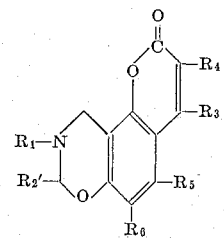

in which $R_1$, $R_3$, $R_4$, $R_5$ and $R_6$ have the previously-given meaning, and $R_2'$ has the same meaning as the previously defined $R_2$, but is different from the group $R_2$ present in the final product resulting from the intermediate, for example, in water, in a lower alkanol, e.g. ethanol and the like, or any other suitable solvent, with an acid, such as a mineral acid, for example, hydrochloric acid (e.g. 10 percent aqueous hydrochloric acid), sulfuric acid and the like. Ring opening may be achieved and completed at room temperature or at an elevated temperature, for example, by refluxing.

Certain starting materials may also be manufactured by reacting a compound of the formula:

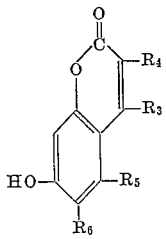

in which $R_3$, $R_4$, $R_5$ and $R_6$ have the previously-given meaning, or a precursor compound of the formula:

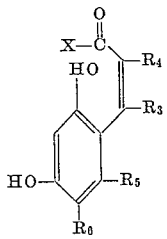

in which $R_3$, $R_4$, $R_5$, $R_6$ and X have the above-given meaning, the precursor compound being capable of eliminating H—X, in which X has the previously-given meaning, under the condition of the reaction to form a coumarin nucleus, or a mixture of such compounds, with at least an equivalent amount of an amine of the formula $R_1$—$NH_2$, in which $R_1$ has the previously-given meaning, in the presence of about one mole of formaldehyde or a reactive derivative thereof. This reaction is carried out as shown hereinabove for the formation of the oxazine ring.

An additional procedure for the manufacture of compounds of this invention having the formula:

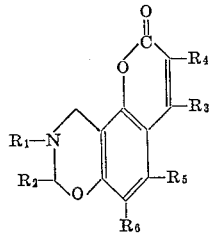

in which $R_2$, $R_3$, $R_4$, $R_5$ and $R_6$ have the above-given meaning, and $R_1$ stands for a radical other than hydrogen, comprises removing in compounds of the formula:

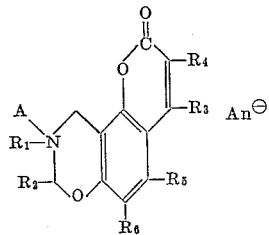

in which $R_1$, $R_2$, $R_3$, $R_4$, $R_5$ and $R_6$ have the previously-given meaning, A stands for a group capable of being split off under the conditions of Hofmann degradation reaction with the loss of a hydrogen atom, and $An^\ominus$ stands for an anion of an acid, the group A and the anion $An^\ominus$ by a Hofmann degradation, and, if desired, carrying out the optional steps.

The group A is primarily a radical of the formula:

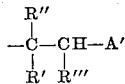

in which each of the radicals R', R" and R"' stands for hydrogen or lower alkyl, e.g. methyl, ethyl and the like, and A' represents a group which during the Hofmann degradation facilitates the formation of a departing compound of the formula:

in which R', R", and R"' have the above-given meaning. A' represents primarily a group which can form together with the newly created double bond a conjugated double bond system; such groups are thus carbocyclic aryl radicals, particularly monocyclic carbocyclic aryl, e.g. phenyl or phenyl substituted by groups, which do not hinder the formation of the double bond in the departing unsaturated compound, as well as a carboxyl group or a functionally converted carboxyl group, such as cyano, or carbo-lower alkoxy, e.g. methoxy, ethoxy and the like, or a mercapto group, or any other suitable substituent.

The anion $An^\ominus$ stands for a hydroxyl ion or for the anion of a strong acid, such as the anion of a strong inorganic acid, e.g. hydrochloric, hydrobromic, hydriodic, sulfuric acid and the like, the anion of a strong organic acid, such as a carboxylic acid, e.g. acetic acid and the like, or the anion of a strong organic sulfonic acid, such as a monocyclic carbocyclic aryl sulfonic acid, e.g. p-toluene sulfonic acid and the like.

The reaction is carried out, for example, by heating the quaternary ammonium compound used as the starting material, preferably in the presence of an inert solvent, such as, for example, a halogenated hydrocarbon, e.g. chloroform and the like, a lower alkanol, e.g. methanol, ethanol and the like, or any other suitable and equivalent solvent. As mentioned before, the radical departs as an alkene compound; such alkene compounds are, for example, carbocyclic aryl-ethenes, such as styrenes (mostly in polymeric form), acrylic acids or functional derivatives thereof, such as acrylonitriles or lower alkyl acrylates. The hydrogen, which is split off, combines with the anion $An^\ominus$ to form a compound of the formula H—An. Whenever H—An stands for an acid, the resulting product may be obtained in the form of an acid addition salt.

The starting material used in this reaction may be prepared from oxazine compounds of the formula:

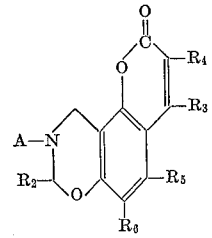

in which $R_2$, $R_3$, $R_4$, $R_5$, $R_6$ and A have the previously-given meaning, by treatment with a reactive ester of an alcohol of the formula $R_1$—OH, in which $R_1$ has the previously-given meaning. A reactive ester of an alcohol is, for example, an ester with a strong acid, such as a mineral acid, e.g. hydrochloric, hydrobromic, hydriodic, sulfuric acid and the like, or a strong organic sulfonic acid, such as an monocyclic carbocyclic aryl sulfonic acid, e.g. p-toluene sulfonic acid and the like. The quaternization reaction is carried out according to the procedure to be shown hereinbelow.

The compounds of this invention can be obtained in the form of the free bases or as the salts thereof. A salt may be converted into the free base, for example, by reaction with an alkaline reagent, such as an alkali metal hydroxide, e.g. lithium hydroxide, sodium hydroxide, potassium hydroxide and the like, an alkali metal carbonate, e.g. sodium carbonate, potassium carbonate, sodium hydrogen carbonate, and the like, ammonia and the like, as well as an anion exchange resin, etc. In view of weakly basic properties of some of the oxazines, their salts may be converted into the free compounds merely by treatment with water. A free base may be converted into its pharmacologically useful acid addition salts by reaction with one of the inorganic or organic acids outlined hereinbefore; for example, a solution of the free base in an inert solvent or solvent mixture may be reacted with the acid or a solution thereof and the desired salt may then be isolated. Mono- or poly-salts may be formed depending on the number of salt-forming groups present in the molecule; they may also be obtained as the hemihydrates, monohydrates, sesquihydrates or polyhydrates depending on the conditions used in the formation of the salts.

Quarternary ammonium derivatives of the compounds of this invention may be obtained, for example, by reacting the tertiary base with an ester formed by an alcohol and a strong inorganic or organic acid. Such acid esters are, for example, lower alkyl halides, e.g. methyl, ethyl, n-propyl or isopropyl chloride, bromide or iodide and the like, di-lower alkyl sulfates, e.g. dimethyl sulfate, diethyl sulfate and the like, lower alkyl lower alkane sulfonates, e.g. methyl or ethyl methane or ethane sulfonate and the like, lower alkyl lower hydroxy-alkane sulfonates, e.g. methyl or ethyl 2-hydroxy-ethane sulfonate and the like, or lower alkyl monocyclic carbocyclic aryl sulfonates, e.g. methyl p-toluene sulfonate and the like. The quaternizing reaction may be performed in the absence or in the presence of an inert solvent or solvent mixture, if necessary, at an elevated temperature, in a closed vessel, and/or in the atmosphere of an inert gas, e.g. nitrogen.

Quaternary ammonium compounds obtained may be converted into the corresponding quaternary ammonium hydroxides, for example, by reacting a quaternary ammonium halide with silver oxide, or a quaternary ammonium sulfate with barium hydroxide, by treating a quaternary ammonium salt with an anion exchanger, or by electrodialysis. From any resulting quaternary ammonium base there may be prepared suitable quaternary ammonium salts by reacting the former with acids, for example, with those outlined hereinbefore for the preparation of the acid addition salts, or with mono-lower alkyl sulfates, e.g. methyl sulfate, ethyl sulfate and the like. A quaternary ammonium compound may also be converted directly into another quaternary ammonium salt without the formation of the quaternary ammonium hydroxide; for example, a quaternary ammonium iodide may be reacted with freshly prepared silver chloride to yield the quaternary ammonium chloride, or a quaternary ammonium iodide may be converted into the corresponding chloride by treatment with hydrochloric acid in anhydrous methanol. Quaternary ammonium compounds may also crystallize as hydrates; mono- or poly-quaternary ammonium compounds may be formed depending on the number of tertiary amino groups.

The invention also comprises any modification of the process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiments of the invention.

This is a continuation-in-part application of my application Serial No. 54,832, filed September 9, 1960, which in turn is a continuation-in-part application of my application Serial No. 850,110, filed November 2, 1959, both now abandoned.

The following examples are intended to illustrate the invention and are not to be construed as being limitations thereon. Temperatures are given in degrees centigrade.

*Example 1*

6.0 g. of trioxymethylene is added to a solution of 0.1 g. of potassium hydroxide in 10 ml. of methanol; the suspension is warmed to effect solution and then cooled in ice. While cooling, 18.1 g. of 2-(3,4-dimethoxy-phenyl)-ethylamine is added, followed by 16.2 g. of 7-hydroxy-coumarin. The oily mixture is heated at 80° for 15 minutes under an atmosphere of nitrogen, cooled and crystallized. The crude product is filtered off, washed with 20 ml. of cold methanol and recrystallized by dissolving it in 100 ml. of methylene chloride, adding 30 ml. of methanol and distilling off the methylene chloride. Small amounts of impurities can be removed by placing a solution of the crude product in 100 ml. of methylene chloride on a column of 300 g. of aluminum oxide (Woelm activity 2, basic) and eluting the product with 5000 ml. of methylene chloride. The purified 9-[2-3,4-dimethoxy-phenyl) - ethyl] - 9,10 - dihydro-2H,8H-pyrano[2,3-f][1,3]benzoxazine-2-one of the formula:

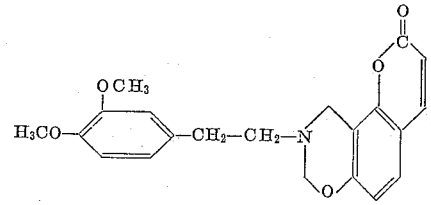

melts at 139°.

*Example 2*

A solution of 3.0 g. of 9-[2-(3,4-dimethoxy-phenyl)-ethyl] - 9,10 - dihydro-2H,8H-pyrano[2,3-f][1,3]benzoxazine-2-one in 25 ml. of methylene chloride is treated with hydrogen chloride gas until no further separation of the hydrochloride occurs. The hydrochloride of the starting material is filtered off and washed several times with 20 ml. portions of methylene chloride, M.P. 163° (decomposition); yield: 100 percent.

*Example 3*

3.6 g. of 9-[2-(3,4-dimethoxy-phenyl)-ethyl]-9,10-dihydro-2H,8H-pyrano[2,3-f][1,3]benzoxazine-2-one is dissolved in 15 ml. of methylene chloride and combined with a solution of 1.9 g. of d-tartaric acid in 15 ml. of isopropanol. 500 ml. of benzene is then added. The crude amorphous product is filtered off, then dissolved in 30 ml. of water and crystallized. The filtered product is washed twice with 30 ml. of water, dried and washed three times with 60 ml. of methylene chloride to yield the d-tartrate of 9-[2-(3,4-dimethoxy-phenyl)-ethyl]-9,10-dihydro-2H, 8H - pyrano[2,3-f][1,3]benzoxazine-2-one, M.P. 112°; yield: 98 percent.

*Example 4*

A solution of 6.0 g. of 9-[2-(3,4-dimethoxy-phenyl)-ethyl] - 9,10-dihydro-2H,8H-pyrano[2,3-f][1,3]benzoxazine-2-one in 30 ml. of methylene chloride and 10 ml. of methyl iodide is allowed to stand at 25° under an atmosphere of nitrogen for three days during which time the product crystallizes out. The methiodide of 9-[2-(3,4-dimethoxy - phenyl) - ethyl]-9,10-dihydro-2H,8H-pyrano [2,3-f][1,3]benzoxazine-2-one is filtered off and washed with 20 ml. of cold methanol, M.P. 198–200°; yield: 100 percent.

*Example 5*

6.0 g. of trioxymethylene is added to a solution of 0.1 g. of potassium hydroxide in 10 ml. of methanol, the suspension warmed to effect solution and then cooled in ice. 10.8 g. of 4-aminomethylpyridine is added while cooling, followed by 17.6 g. of 7-hydroxy-4-methyl-coumarin. The mixture is heated at 80° for 15 minutes under an atmosphere of nitrogen, cooled and crystallized from ethanol by dissolving the material first in methylene chloride, adding ethanol and distilling methylene chloride from the mixture. The 4-methyl-9-(4-pyridylmethyl)-9,10 - dihydro - 2H,8H-pyrano[2,3-f][1,3]benzoxazine-2-one of the formula:

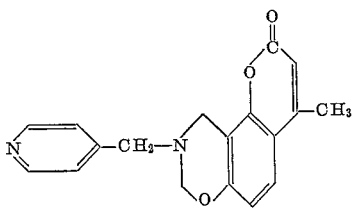

melts at 156°; yield: 35 percent.

*Example 6*

A solution of 2.0 g. of 4-methyl-9-(4-pyridylmethyl)-9,10 - dihydro - 2H,8H-pyrano[2,3-f][1,3]benzoxazine-2-one in 30 ml. of methylene chloride and 10 ml. of methyl iodide is kept at 25° for 6 hours and then at 0° for an additional 15 hours under an atmosphere of nitrogen. The monomethiodide of 4-methyl-9-(4-pyridylmethyl)-pyrano[2,3-f][1,3]benzoxazine-2-one is filtered off and recrystallized from methanol, M.P. 205°; yield: 100 percent.

*Example 7*

By heating a solution of 4-methyl-9-(4-pyridylmethyl)-9,10 - dihydro - 2H,8H-pyrano[2,3-f][1,3]benzoxazine-2-one in 25 ml. of methyl iodide at 70° under nitrogen for 48 hours, cooling, evaporating under reduced pressure and washing the residue with 10 ml. of cold methanol the dimethiodide of the starting material is formed. It is recrystallized from methanol, M.P. 234°; yield: 100 percent.

*Example 8*

6.0 g. of trioxymethylene is added to a solution of 0.1 g. of potassium hydroxide in 10 ml. of methanol, the suspension is warmed to effect solution and then cooled in ice. 9.9 g. of cyclohexylamine is added while cooling, followed by 17.6 g. of 7-hydroxy-4-methyl-coumarin. The mixture is heated at 100° for one hour under an atmosphere of nitrogen, cooled and poured into 1000 ml. of water. The reaction product is extracted with five portions of 100 ml. of methylene chloride, the solvent is concentrated to yield a crude oil, which is further purified by dissolving it in 100 ml. of benzene, and passing this solution over a column containing 100 g. of aluminum oxide (Woelm activity 3, basic). The 9-cyclohexyl-4-methyl - 9,10 - dihydro-2H,8H-pyrano[2,3-f][1,3]benzoxazine-2-one of the formula:

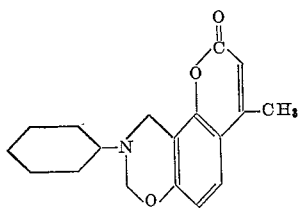

is eluted with 3000 ml. of benzene, the eluates are concentrated to yield the crystalline product, which melts at 129° after recrystallization from ethanol; yield: 26 percent.

*Example 9*

18.5 ml. of aqueous formaldehyde, containing 38 percent formaldehyde is added to 12.4 ml. of an aqueous methylamine solution (25 percent), followed by 16.2 g. of 7-hydroxy-coumarin in 25 ml. of methanol. The reaction mixture is refluxed for ninety minutes, cooled, and the product is crystalliezed. On recrystallization from ethanol a product is obtained which is further purified by passing a solution thereof in 200 ml. of benzene over an aluminum oxide column (100 g., Woelm activity 2, basic) and eluting the desired product with benzene. The 9 - methyl - 9,10-dihydro-2H,8H-pyrano[2,3-f][1,3]benzoxazine-2-one of the formula:

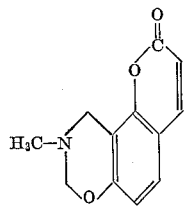

recrystallized from ethanol, M.P. 140°; yield: 57 percent.

*Example 10*

A suspension of 6.0 g. of trioxymethylene in 10 ml. of methanol containing 0.1 g. of potassium hydroxide is warmed until complete solution is obtained. The latter is cooled, 18.1 g. of 2-(3,4-dimethoxy-phenyl)-ethyl-amine is added, followed by 17.6 g. of 7-hydroxy-4-methyl-coumarin, and the mixture is heated to 80° for 15 minutes under an atmosphere of nitrogen. After cooling, 24.7 g. of a crystalline material is filtered off, washed with cold methanol and recrystallized from methylene chloride and methanol. A solution of the recrystallized material in methylene chloride is passed through a column containing aluminum oxide (Woelm activity 2, basic); the purified 9-[2-(3,4-dimethoxy - phenyl) - ethyl]-4-methyl-9,10 - dihydro - 2H,8H-pyrano[2,3-f][1,3]benzoxazine-2-one of the formula:

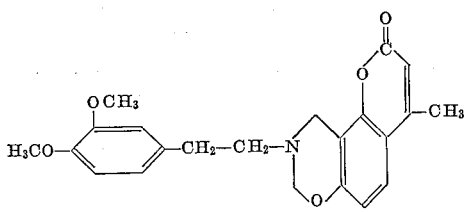

melts at 130–134°; yield: 21.3 g.

The hydrochloride and the tartrate of 9-[2-(3,4-dimethoxy-phenyl) - ethyl] - 4 - methyl - 9,10 - dihydro - 2H,8H-pyrano[2,3-f][1,3]benzoxazine - 2 - one are prepared as shown in Examples 2 and 3, respectively; they melt at 173° and 105°, respectively.

The methiodide is prepared as shown in Example 4; the 9-[2-(3,4-dimethoxy-phenyl)-ethyl]-4-methyl-9,10-dihydro-2H,8H-pyrano[2,3-f][1,3]benzoxazine-2-one methiodide melts at 206°; yield: quantitative.

The following compounds are prepared according to the previously-described procedure:

4,9 - dimethyl - 9,10-dihydro-2H,8H-pyrano[2,3-f][1,3]-benzoxazine-2-one, M.P. 158° (recrystallized from methylene chloride and ethanol or methanol); yield: 56 percent.

9-cyclohexyl - 9,10 - dihydro-2H,8H-pyrano[2,3-f][1,3]-benzoxazine-2-one, M.P. 126° (recrystallized from methylene chloride and ethanol or methanol); yield: 27 percent.

9-benzyl - 9,10 - dihydro-2H,8H-pyrano[2,3-f][1,3]benzoxazine-2-one, M.P. 128° (recrystallized from methylene chloride and ethanol or methanol); yield: 24 percent.

9-benzyl - 4 - methyl-9,10-dihydro-2H,8H-pyrano[2,3-f][1,3]benzoxazine-2-one, M.P. 136° (recrystallized from methylene chloride and ethanol or methanol); yield: 73 percent.

9 - (2-phenylethyl) - 9,10 - dihydro-2H,8H-pyrano[2,3-f][1,3]benzoxazine-2-one, M.P. 119° (recrystallized from methylene chloride and ethanol or methanol); yield: 20 percent.

4 - methyl-9-(2-phenylethyl)-9,10-dihydro-2H,8H-pyrano[2,3-f][1,3]benzoxazine-2-one, M.P. 120° (recrystallized from methylene chloride and ethanol or methanol); yield: 60 percent.

4 - methyl-9-(1-phenylethyl)-9,10-dihydro-2H,8H-pyrano[2,3-f][1,3]benzoxazine-2-one, M.P. 117° (recrystallized from methylene chloride and ethanol or methanol); yield: 44 percent.

9 - (2-pyridylmethyl)-9,10-dihydro-2H,8H-pyrano[2,3-f][1,3]benzoxazine-2-one, M.P. 145° (recrystallized from methylene chloride and ethanol or methanol); yield: 56 percent.

4 - methyl - 9 - (2 - pyridylmethyl)-9,10-dihydro-2H,8H-pyrano[2,3-f][1,3]benzoxazine-2-one, M.P. 161° (recrystallized from methylene chloride and ethanol or methanol); yield: 78 percent.

9 - (3-pyridylmethyl)-9,10-dihydro-2H,8H-pyrano[2,3-f][1,3]benzoxazine-2-one, M.P. 138° (recrystallized from methylene chloride and ethanol or methanol); yield: 39 percent.

4-methyl - 9 - (3-pyridylmethyl) - 9,10 - dihydro - 2H,8H- pyrano[2,3-f][1,3]benzoxazine-2-one, M.P. 164° (recrystallized from methylene chloride and ethanol or methanol); yield: 75 percent.

9 - (4-pyridylmethyl)-9,10-dihydro-2H,8H-pyrano[2,3-f][1,3]benzoxazine - 2 - one, M.P. 144° (recrystallized from methylene chloride and ethanol or methanol); yield: 32 percent.

9-carbamylmethyl - 9,10 - dihydro-2H,8H-pyrano[2,3-f][1,3]benzoxazine-2-one, M.P. 195° (recrystallized from ethanol); yield: 11 percent.

9 - carbamylmethyl-4-methyl-9,10-dihydro-2H,8H-pyrano[2,3-f][1,3]benzoxazine-2-one, M.P. 199° (recrystallized from ethanol); yield: 11 percent.

*Example 11*

A mixture of 7-hydroxy - 8 - {N-[2-(3,4 - dimethoxy-phenyl)-ethyl]-aminomethyl}-coumarin and 0.37 g. of 4-nitro-benzaldehyde in 20 ml. of methylene chloride and 20 ml. of methanol is refluxed for five hours in an atmosphere of nitrogen. The solution is then concentrated to a small volume; upon chilling a precipitate is formed, which is filtered off (yield: 1.1 g.) and recrystallized from a mixture of methylene chloride and benzene to yield the desired 9 - [2 - (3,4-dimethoxy-phenyl)-ethyl]-8-(4-nitro-phenyl)-9,10-dihydro - 2H,8H - pyrano[2,3f][1,3]benzoxazine-2-one of the formula:

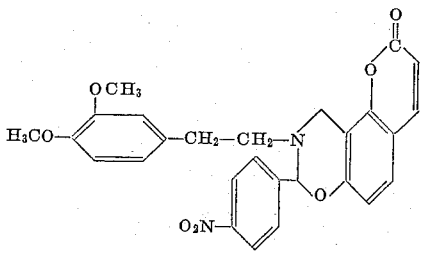

which melts at 170–171°.

The starting material may be prepared as follows: To a suspension of 9-[2-(3,4-dimethoxy-phenyl)-ethyl]-9,10-dihydro-2H,8H - pyrano[2,3-f][1,3]benzoxazine-2-one in 150 ml. of methanol is added 10 ml. of concentrated aqueous hydrochloric acid; the clear acidic solution is refluxed for 45 minutes and then cooled. 2000 ml. of diethyl ether is added, the solvents are decanted, the precipitate is dissolved in methanol and the resulting solution is refluxed for thirty minutes. On cooling and adding diethyl ether, 12.0 g. of 7-hydroxy-8-{N-[2-(3,4-dimethoxy-phenyl) - ethyl]-aminomethyl}-coumarin hydrochloride precipitates and is recrystallized from methanol, M.P. 222°.

A mixture of 6.0 g. of 7-hydroxy-8-{N-[2-(3,4-dimethoxyphenyl)-ethyl]-aminomethyl}-coumarin hydrochloride in 60 ml. of a saturated sodium bicarbonate solution is stirred for two hours, the precipitate is filtered off, washed with 10 ml. of water and recrystallized from a mixture of methylene chloride and benzene to give 4.6 g. of 7-hydroxy - 8 - {N-[2-(3,4-dimethoxy-phenyl)-ethyl]-aminomethyl}-coumarin of the formula:

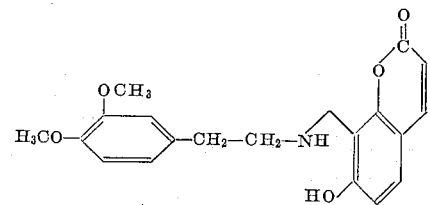

which melts at 138–139°. Its O,N-diacetyl derivative has a melting point of 179–180°.

Other 8-substituted 9,10-dihydro-2H,8H-pyrano[2,3-f][1,3]benzoxazine-2-one's prepared according to the above procedure by using the appropriate starting materials, are 8-(4-chloro-phenyl)-9-[2-(3,4-dimethoxy-phenyl)-ethyl] - 9,10 - dihydro - 2H,8H-pyrano[2,3-f][1,3]benzoxazine-2-one, M.P. 104–105° after recrystallization from a mixture of methylene chloride, methanol and diethylether, 9-[2-(3,4 - dimethoxy-phenyl)-ethyl]-8-(4-pyridyl)-9,10-dihydro - 2H,8H - pyrano[2,3-f][1,3]benzoxazine-2-one, M.P. 160–161° after recrystallization from a mixture of methylene chloride and cyclohexane, and the like.

What is claimed is:

1. A member of the group consisting of a compound of the formula:

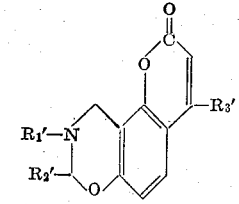

in which $R_1'$ is a member selected from the group consisting of lower alkyl, lower alkyl substituted by carbamyl, lower alkyl substituted by carbo-lower alkoxy, cycloalkyl having from five to six carbon atoms as ring members, phenyl-lower alkyl, (lower alkoxy-phenyl)-lower alkyl and pyridyl-lower alkyl, $R_2'$ stands for a member selected from the group consisting of hydrogen, phenyl, halogenophenyl, nitro-phenyl and pyridyl, and $R_3'$ is a member selected from the group consisting of hydrogen and lower alkyl, a non-toxic acid addition salt thereof, and a lower alkyl quaternary ammonium compound thereof.

2. 9-[2-(3,4-dimethoxy-phenyl) - ethyl] - 9,10-dihydro-2H,8H-pyrano[2,3-f][1,3]benzoxazine-2-one.

3. 9-[2-(3,4-dimethoxy-phenyl) - ethyl] - 9,10-dihydro-2H,8H-pyrano[2,3-f][1,3]benzoxazine-2-one methiodide.

4. 9-[2-(3,4-dimethoxy-phenyl) - ethyl]-4-methyl-9,10-dihydro-2H,8H-pyrano[2,3-f][1,3]benzoxazine-2-one.

5. 9-[2-(3,4-dimethoxy-phenyl) - ethyl]-4-methyl-9,10-dihydro-2H,8H - pyrano[2,3-f][1,3]benzoxazine - 2 - one methiodide.

6. 9-(4-pyridylmethyl) - 9,10 - dihydro-2H,8H-pyrano-[2,3-f][1,3]benzoxazine-2-one.

7. 9-(4-pyridylmethyl) - 9,10 - dihydro-2H,8H-pyrano-[2,3-f][1,3]benzoxazine-2-one methiodide.

8. 9-cyclohexyl-4-methyl-9,10-dihydro - 2H,8H-pyrano[2,3-f][1,3]benzoxazine-2-one.

9. 9-methyl-9,10-dihydro - 2H,8H - pyrano[2,3-f][1,3]benzoxazine-2-one.

No references cited.